United States Patent
Zhang et al.

(10) Patent No.: US 9,008,219 B2
(45) Date of Patent: Apr. 14, 2015

(54) METHOD AND APPARATUS FOR TRANSMITTING DATA IN MULTIPLE-ANTENNA SYSTEM

(71) Applicant: Huawei Technologies Co., Ltd., Shenzhen, Guangdong (CN)

(72) Inventors: Shunqing Zhang, Shanghai (CN); Yan Chen, Shanghai (CN); Yalin Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/085,107

(22) Filed: Nov. 20, 2013

(65) Prior Publication Data

US 2014/0093012 A1    Apr. 3, 2014

Related U.S. Application Data

(63) Continuation of application No. PCT/CN2011/074861, filed on May 30, 2011.

(51) Int. Cl.
*H04L 27/00* (2006.01)
*H04B 7/06* (2006.01)
*H04W 52/42* (2009.01)

(52) U.S. Cl.
CPC ............ *H04B 7/0608* (2013.01); *H04B 7/0691* (2013.01); *H04W 52/42* (2013.01); *Y02B 60/50* (2013.01); *H04B 7/068* (2013.01); *H04B 7/0693* (2013.01); *H04B 7/0669* (2013.01)

(58) Field of Classification Search
None
See application file for complete search history.

(56) References Cited

U.S. PATENT DOCUMENTS 6,600,934 B1    7/2003   Yun et al.
7,308,035 B2 *  12/2007  Rouquette et al. ............ 375/267

(Continued)

FOREIGN PATENT DOCUMENTS

CN    1499743 A    5/2004
CN    1829115 A    9/2006

(Continued)

OTHER PUBLICATIONS

Alamouti, "A Simple Transmit Diversity Technique for Wireless Communications," IEEE Journal on Select Areas in Communications, vol. 16, No. 8, pp. 1451-1458, IEEE, New York, New York (Oct. 1998).

(Continued)

*Primary Examiner* — Chieh M Fan
*Assistant Examiner* — Wednel Cadeau
(74) *Attorney, Agent, or Firm* — Leydig, Voit & Mayer, Ltd.

(57) ABSTRACT

Embodiments of the present invention disclose a method and an apparatus for transmitting data in a multiple-antenna system, which are applied in a transmit diversity mode. The method includes: in a data transmission period, determining, according to transmission quality of the system, the number of antennas to be turned off and turning-off time; and in the turning-off time, turning off the determined number of antennas, turning on remaining antennas other than the antennas that are turned off, and transmitting, through the remaining antennas, the data to be transmitted; and during the remaining time of the data transmission period excluding the turning-off time, turning on all antennas and transmitting, through all the antennas, the data to be transmitted. According to the embodiments of the present invention, power consumption may be decreased while at the same time dynamic transmission performance of the system is considered, decreasing implementation complexity.

17 Claims, 11 Drawing Sheets

(56) References Cited

U.S. PATENT DOCUMENTS

| | | | |
|---|---|---|---|
| 7,542,733 B1 | 6/2009 | Ngan | |
| 8,374,260 B2 | 2/2013 | Schirmacher et al. | |
| 2005/0197079 A1* | 9/2005 | Banister et al. | 455/135 |
| 2007/0224951 A1* | 9/2007 | Gilb et al. | 455/127.5 |
| 2008/0151798 A1 | 6/2008 | Camp | |
| 2009/0191831 A1 | 7/2009 | Sasaki et al. | |
| 2012/0178492 A1 | 7/2012 | Lin et al. | |

FOREIGN PATENT DOCUMENTS

| | | |
|---|---|---|
| CN | 101416420 A | 4/2009 |
| CN | 101536357 A | 9/2009 |
| CN | 101569113 A | 10/2009 |
| CN | 101778458 A | 7/2010 |
| CN | 101931448 A | 12/2010 |
| WO | WO 2009105352 A1 | 8/2009 |

OTHER PUBLICATIONS

"Further Results on SCH Search Performance with Transmit Diversity," 3GPP TSG-RAN Working Group 1 Meeting #46-bis, Seoul, Korea, Document R1-062755, $3^{rd}$ Generation Partnership Project, Valbonne, France (Oct. 9-13, 2006).

"Extended cell DTX for enhanced energy-efficient network operation," 3GPP TSG-RAN WG1 #59, Jeju, Korea, Document R1-095011, $3^{rd}$ Generation Partnership Project, Valbonne, France (Nov. 9-13, 2009).

"Energy saving techniques for LTE," 3GPP TSG RAN WG2 #69, San Francisco, California, Document R2-101824 (updates R2-101213), $3^{rd}$ Generation Partnership Project, Valbonne, France (Feb. 22-26, 2010).

"Changing eNB number of transmit antenna for energy saving," 3GPP TSG-RAN WG2 Meeting #70, Montreal, Canada, Document R2-103403 (updates R2-102911), $3^{rd}$ Generation Partnership Project, Valbonne, France (May 10-14, 2010).

"Consideration on reducing number of antenna ports for energy saving," GPP TSG-RAN WG2 Meeting #71bis, Xi'an, China, Document R2-105370, $3^{rd}$ Generation Partnership Project, Valbonne, France (Oct. 11-15, 2010).

* cited by examiner

| Antenna Transmitting State | Antenna 0 | Antenna 1 | Antenna 2 | Antenna 3 | Corresponding Transmit Signal (With FSTD+SFBC as an example) |
|---|---|---|---|---|---|
| State 0 | 0 | 0 | 0 | 0 | $\begin{pmatrix} 0 & 0 & 0 & 0 \\ 0 & 0 & 0 & 0 \\ 0 & 0 & 0 & 0 \\ 0 & 0 & 0 & 0 \end{pmatrix}$ |
| State 1 | 0 | 0 | 0 | 1 | $\begin{pmatrix} 0 & 0 & 0 & 0 \\ 0 & 0 & 0 & 0 \\ 0 & 0 & 0 & -s_4^* \\ 0 & 0 & 0 & s_3^* \end{pmatrix}$ |
| State 2 | 0 | 0 | 1 | 0 | $\begin{pmatrix} 0 & 0 & -s_2^* & 0 \\ 0 & 0 & s_1^* & 0 \\ 0 & 0 & 0 & 0 \\ 0 & 0 & 0 & 0 \end{pmatrix}$ |
| State 3 | 0 | 0 | 1 | 1 | $\begin{pmatrix} 0 & 0 & -s_2^* & 0 \\ 0 & 0 & s_1^* & 0 \\ 0 & 0 & 0 & -s_4^* \\ 0 & 0 & 0 & s_3^* \end{pmatrix}$ |
| State 4 | 0 | 1 | 0 | 0 | $\begin{pmatrix} 0 & 0 & 0 & 0 \\ 0 & 0 & 0 & 0 \\ 0 & s_3 & 0 & 0 \\ 0 & s_4 & 0 & 0 \end{pmatrix}$ |
| State 5 | 0 | 1 | 0 | 1 | $\begin{pmatrix} 0 & 0 & 0 & 0 \\ 0 & 0 & 0 & 0 \\ 0 & s_3 & 0 & -s_4^* \\ 0 & s_4 & 0 & s_3^* \end{pmatrix}$ |

FIG. 7A

| | | | | | |
|---|---|---|---|---|---|
| State 6 | 0 | 1 | 1 | 0 | $\begin{pmatrix} 0 & 0 & -s_2^* & 0 \\ 0 & 0 & s_1^* & 0 \\ 0 & s_3 & 0 & 0 \\ 0 & s_4 & 0 & 0 \end{pmatrix}$ |
| State 7 | 0 | 1 | 1 | 1 | $\begin{pmatrix} 0 & 0 & -s_2^* & 0 \\ 0 & 0 & s_1^* & 0 \\ 0 & s_3 & 0 & -s_4^* \\ 0 & s_4 & 0 & s_3^* \end{pmatrix}$ |
| State 8 | 1 | 0 | 0 | 0 | $\begin{pmatrix} s_1 & 0 & 0 & 0 \\ s_2 & 0 & 0 & 0 \\ 0 & 0 & 0 & 0 \\ 0 & 0 & 0 & 0 \end{pmatrix}$ |
| State 9 | 1 | 0 | 0 | 1 | $\begin{pmatrix} s_1 & 0 & 0 & 0 \\ s_2 & 0 & 0 & 0 \\ 0 & 0 & 0 & -s_4^* \\ 0 & 0 & 0 & s_3^* \end{pmatrix}$ |
| State 10 | 1 | 0 | 1 | 0 | $\begin{pmatrix} s_1 & 0 & -s_2^* & 0 \\ s_2 & 0 & s_1^* & 0 \\ 0 & 0 & 0 & 0 \\ 0 & 0 & 0 & 0 \end{pmatrix}$ |
| State 11 | 1 | 0 | 1 | 1 | $\begin{pmatrix} s_1 & 0 & -s_2^* & 0 \\ s_2 & 0 & s_1^* & 0 \\ 0 & 0 & 0 & -s_4^* \\ 0 & 0 & 0 & s_3^* \end{pmatrix}$ |
| State 12 | 1 | 1 | 0 | 0 | $\begin{pmatrix} s_1 & 0 & 0 & 0 \\ s_2 & 0 & 0 & 0 \\ 0 & s_3 & 0 & 0 \\ 0 & s_4 & 0 & 0 \end{pmatrix}$ |

FIG. 7B

| State 13 | 1 | 1 | 0 | 1 | $\begin{pmatrix} s_1 & 0 & 0 & 0 \\ s_2 & 0 & 0 & 0 \\ 0 & s_3 & 0 & -s_4^* \\ 0 & s_4 & 0 & s_3^* \end{pmatrix}$ |
|---|---|---|---|---|---|
| State 14 | 1 | 1 | 1 | 0 | $\begin{pmatrix} s_1 & 0 & -s_2^* & 0 \\ s_2 & 0 & s_1^* & 0 \\ 0 & s_3 & 0 & 0 \\ 0 & s_4 & 0 & 0 \end{pmatrix}$ |
| State 15 | 1 | 1 | 1 | 1 | $\begin{pmatrix} s_1 & 0 & -s_2^* & 0 \\ s_2 & 0 & s_1^* & 0 \\ 0 & s_3 & 0 & -s_4^* \\ 0 & s_4 & 0 & s_3^* \end{pmatrix}$ |

FIG. 7C

METHOD AND APPARATUS FOR TRANSMITTING DATA IN MULTIPLE-ANTENNA SYSTEM

CROSS-REFERENCE TO RELATED APPLICATIONS

This application is a continuation of International Patent Application No. PCT/CN2011/074861, filed on May 30, 2011, which is hereby incorporated by reference in its entirety.

FIELD OF THE INVENTION

The present invention relates to the field of radio communication technologies, and in particular, to a method and an apparatus for transmitting data in a multiple-antenna system.

BACKGROUND OF THE INVENTION

A multiple-antenna system is a system where a transmitting end or both a transmitting end and a receiver use multiple antennas for transmission or reception. A multiple-antenna technology utilizes the spatial channel characteristics provided by the multiple-antenna system to implement better utilization of spatial channels by using proper forms of transmit signals and receiver designs under different operating scenarios, thus increasing system capacity or enhancing transmission reliability. It has been proved that the multiple-antenna technology may achieve many different types of transmission gains without increasing the total transmit power. Based on the foregoing advantages, the multiple-antenna technology has been widely applied in many communication systems such as High Speed Packet Access, HSPA, Long Term Evolution, LTE, and Worldwide Interoperability for Microware Access, WiMAX.

However, the introduction of multiple-antenna technology gives rise to additional costs. Generally, each receive and transmit antenna is connected to a radio frequency channel which includes radio frequency circuit modules such as a power amplifier and a filter. From the perspective of energy consumption, the energy consumption of the radio frequency channels accounts for over 50% of the energy consumption of a radio base station as a whole. Even if no data is transmitted, the static power consumption for maintaining the normal operating state of radio frequency devices in the radio frequency channels still needs a high power consumption overhead. Therefore, in the multiple-antenna system, because the number of radio frequency channels is increased, the power consumption caused by the radio frequency channels is also increased accordingly, and finally, the power consumption of the base station as a whole is increased. How to decrease the power consumption in the multiple-antenna system without affecting quality of service is a pressing issue currently.

In the prior art, a method for decreasing power consumption in a multiple-antenna system is using an antenna switched diversity technology. The antenna switched diversity technology means that when there are multiple transmit antennas on the transmitting end, one of the antennas is selected according to a certain sequence in time or frequency for transmission. If the antennas are switched on different subcarriers, it is known as frequency switched transmit diversity (Frequency Switched Transmit Diversity, FSTD); and if the antennas are switched at different time, it is known as time switched transmit diversity (Time Switched Transmit Diversity, TSTD). FIG. 1 is a schematic structural diagram of an antenna switched diversity technology used in a multiple-antenna system for transmitting data in the prior art. In this method, at each determined time or determined frequency, the number of antennas that are turned on is fixed, and for the multiple-antenna system, using the fixed number of antennas to transmit data may inevitably affect the dynamic transmission performance of the system, such as a packet loss rate or a retransmission rate.

Another way of decreasing power consumption in a multiple-antenna system is to reduce the number of transmit antennas, thus turning off some frequency channels. The specific method is as follows: according to current service needs and service change regularity of a time period, the base station of each cell determines the number of transmit antennas to be used for the cell for the next time period; the base station sends a message to all terminals in the cell to notify that the number of transmit antennas is changed; and after receiving the message of notification, the terminals perform corresponding configuration. In the process of implementing this method in an LTE system, because different numbers of transmit antennas correspond to different CRC masks, after a terminal configures a wrong number of transmit antennas, a wrong PBCH CRC mask may be used at the time of CRC decoding, thus leading to a CRC check failure. In order to ensure that the terminal does not make a mistake in configuring the number of transmit antennas, there should be corresponding measures to ensure that the terminal currently acquires the correct number of transmit antennas, which needs an additional scheme design and signaling design, thus inevitably causing an additional signaling overhead and processing delay.

Furthermore, for the terminal itself, the protocol of the terminal needs to be changed; in addition, with respect to different types of terminals, different design schemes need to be used. Therefore, the implementation complexity is also increased.

SUMMARY OF THE INVENTION

Embodiments of the present invention provide a method and an apparatus for transmitting data in a multiple-antenna system, which decreases power consumption while at the same time considers dynamic transmission performance of the system without the need for an additional scheme design or signaling design and without the need to make any change to a terminal, thus decreasing implementation complexity.

The embodiments of the present invention disclose the following technical solutions:

A method for transmitting data in a multiple-antenna system, which is applied in a transmit diversity mode, includes:

in a data transmission period, determining, according to transmission quality of the system, the number of antennas to be turned off and turning-off time; and during the turning-off time, turning off the determined number of antennas, turning on remaining antennas other than the antennas that are turned off, and transmitting, through the remaining antennas, the data to be transmitted; and during the remaining time of the data transmission period excluding the turning-off time, turning on all the antennas and transmitting, through all the antennas, the data to be transmitted.

An apparatus for transmitting data in a multiple-antenna system, which is applied in a transmit diversity mode, includes:

a determining unit, configured to determine, in a data transmission period according to transmission quality of the system, the number of antennas to be turned off and turning-off time;

a first transmitting unit, configured to turn off the determined number of antennas in the turning-off time, turn on remaining antennas other than the antennas that are turned off, and transmit, through the remaining antennas, the data to be transmitted; and a second transmitting unit, configured to turn on all the antennas during the remaining time of the data transmission period excluding the turning-off time, and transmit, through all the antennas, the data to be transmitted.

As may be seen from the foregoing embodiments, in the technical solutions disclosed by the present invention, the antennas are turned off dynamically according to the transmission quality of the system, which not only reduces dynamic and static energy consumption of radio frequency channels corresponding to the antennas that are turned off, thus reducing the total transmit power consumption of the system, but also considers the dynamic transmission performance of the system.

In addition, while dynamically changing the number of transmit antennas to achieve the objective of energy saving, the technical solutions disclosed by the embodiments of the present invention, as compared with conventional mechanisms for changing the number of antennas, reduce notification signaling overhead and improve flexibility of applications, which are mainly reflected in the following aspects:

(1) Because the technical solutions are applied in a diversity mode, when the data to be transmitted is transmitted only through the antennas that are turned on, the receiving end receives the data in a normal way of reception as before the antennas are turned off. Therefore, the receiver structure on the receiving end does not need to be changed with the dynamic change of the number of transmit antennas, and the reception is still performed in a way under original number of antennas, thus maintaining the continuity of the way of transmission and reception and reducing protocol process overhead.

(2) Further, because the receiving end receives the data in the normal way of reception as before the antennas are turned off, the transmitting end does not need to notify the change of the number of transmit antennas. Therefore, the transmitting end does not need to transfer additional signaling to the receiving end because of the change of the number of transmit antennas, thus reducing signaling overhead.

(3) Because the number of antennas that are turned off and the length of the turning-off time may be changed in each data transmission period, rather than fixed numerical values, the way of transmission of the antennas may be changed flexibly, thus accommodating to the change of the amount of service traffic or channel fluctuation in a short time.

BRIEF DESCRIPTION OF THE DRAWINGS

To make the technical solutions of the embodiments of the present invention or the prior art clearer, the accompanying drawings used in the description of the embodiments or the prior art are briefly described below. Evidently, the accompanying drawings illustrate some exemplary embodiments of the present invention and persons skilled in the art may obtain other drawings based on these drawings without creative efforts.

FIGS. 7A, 7B and 7C is a schematic diagram of a mode of transmitting data in a four-antenna system according to the present invention;

DETAILED DESCRIPTION OF THE EMBODIMENTS

To make the objectives, features, and advantages of the present invention more apparent and understandable, the embodiments of the present invention are described below in detail with reference to the accompanying drawings.

Embodiment 1

Figure 1:
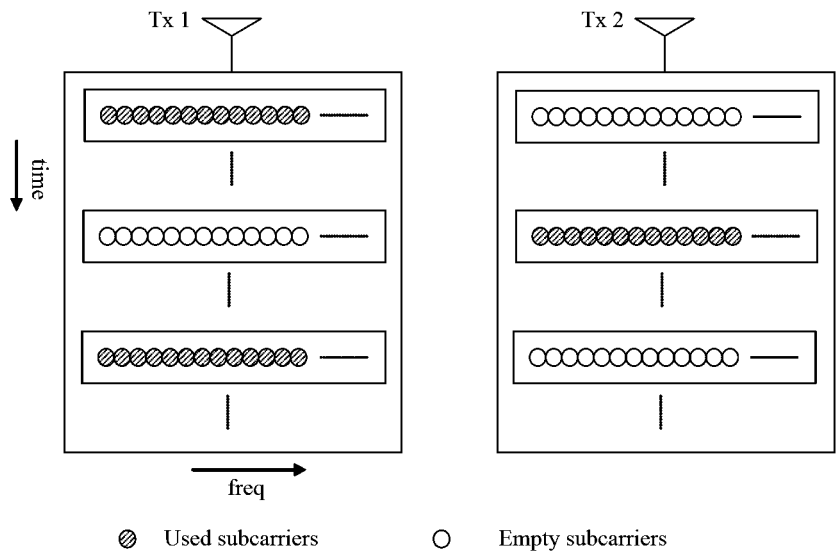
FIG. 1 is a schematic structural diagram of an antenna switched diversity technology used in a multiple-antenna system for transmitting data in the prior art.
Figure 2:
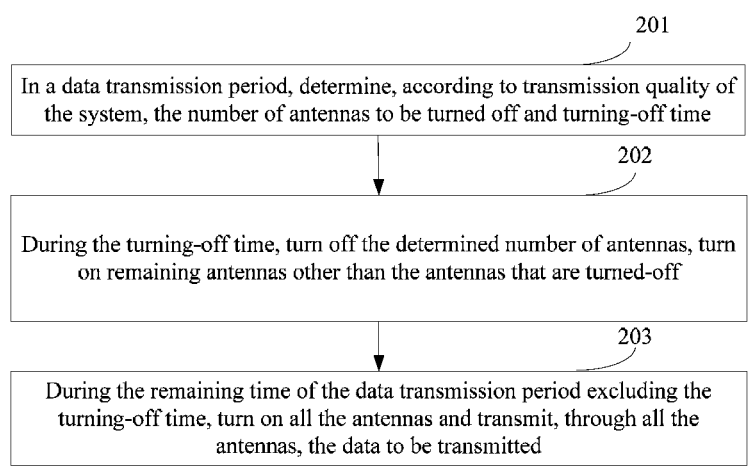
FIG. 2 is a flowchart of an embodiment of a method for transmitting data in a multiple-antenna system according to the present invention.

FIG. 2 is a flowchart of an embodiment of a method for transmitting data in a multiple-antenna system according to the present invention. This method is applied to a device having multiple antennas, such as a base station or a user terminal, where the device may perform radio communication through the multiple antennas on the device. The method includes the following steps:

Step 201: In a data transmission period, determine, according to transmission quality of the system, the number of antennas to be turned off and turning-off time.

It should be emphasized that in the technical solutions of the present invention, the "transmission quality of the system" includes a bit error rate, a retransmission rate, or a packet loss rate, and of course, also includes other parameters that may reflect the transmission quality of the system. In the embodiments of the present invention, the specific parameters of the transmission quality of the system are not limited.

In a multiple-antenna system in a transmit diversity mode, the number of transmit antennas is a multiple of 2. Two antennas and four antennas are the most common ways of antenna configuration. With two antennas as an example, there are four antenna transmitting states in total, as shown in the table below.

| Antenna Transmitting State | Antenna 0 | Antenna 1 | Corresponding Transmit Signal (With Space Frequency Block coding SFBC as an example) |
|---|---|---|---|
| State 0 | 0 | 0 | $\begin{pmatrix} 0 & 0 \\ 0 & 0 \end{pmatrix}$ |
| State 1 | 0 | 1 | $\begin{pmatrix} 0 & -s_1^* \\ 0 & s_0^* \end{pmatrix}$ |
| State 2 | 1 | 0 | $\begin{pmatrix} s_0 & 0 \\ s_1 & 0 \end{pmatrix}$ |
| State 3 | 1 | 1 | $\begin{pmatrix} s_0 & -s_1^* \\ s_1 & s_0^* \end{pmatrix}$ |

In the state 0, the number of antennas that are turned off is 2, that is, both the antennas are turned off. In the state 1 and state 2, the number of antennas that are turned off is 1. In the state 3, the number of antennas that are turned off is 0, that is, neither of the antennas is turned off.

Preferably, the time in which the antennas are turned off is directly proportional to the transmission quality of the system. If according to the magnitude of the retransmission rate, it is determined that the transmission quality of the system is very low, the time in which the antennas are turned off is reduced accordingly; and if according to the magnitude of the retransmission rate, the transmission quality of the system is very high, the time in which the antennas are turned off may be increased. The state in which both the antennas are turned off is only used at the time when no service needs to be transmitted (including pilots and data).

In each antenna transmitting state, the length of the turning-off time may also vary. For example, for a two-antenna system, if it is determined that the antenna transmitting state is the state 1, that is, the antenna 0 is turned off and the antenna 1 is turned on, for the antenna 0 that is turned off, the turning-off time may account for 20%, 40%, 60%, or 80% of the whole data transmission period, and of course, other percentages are also possible. It should be emphasized that in all percentage values, 0% and 100% also have actual physical meanings. If the turning-off time of an antenna accounts for 0% of the whole data transmission period, it indicates that the antenna is not turned off for the whole data transmission period, and if the turning-off time of the antenna accounts for 100% of the whole data transmission period, it indicates that the antenna is turned off for the whole data transmission period. The length of the turning-off time is also directly proportional to the transmission quality of the system. If according to the magnitude of the retransmission rate, it is determined that the transmission quality of the system is very low, when the number of antennas to be turned off has been determined, the turning-off time may be reduced accordingly, for example, the turning-off time accounts for 20% of the whole data transmission period. If according to the magnitude of the retransmission rate, it is determined that the transmission quality of the system is very high, when the number of antennas to be turned off is determined, the turning-off time may be increased accordingly. For example, the turning-off time accounts for 80% of the whole data transmission period.

It should be noted that in the technical solutions of the present invention, neither the specific number of antennas to be turned off nor the specific time in which the antennas are turned off is limited. In different multiple-antenna systems, for example, in a multiple-antenna system with two antennas or a multiple-antenna system with four antennas, there are various different antenna transmitting states, and each antenna transmitting state corresponds to a different number of antennas that are turned off. In applications, a final number needs to be determined according to a specific system state (whether the system is a two-antenna system or a four-antenna system) and the use needs of an operator (for example, in a two-antenna system, when the transmission quality of the system is very low, if the operator has a strict requirement for data transmission and high quality transmission needs to be ensured, the operator may choose not to turn off any antenna, and if the operator has a loose requirement for data transmission, the operator may choose to turn off one antenna). Similarly, for the determined number of antennas to be turned off, the specific length of the turning-off time also needs to be determined according to the use needs of the operator (for example, in a two-antenna system, if one antenna is turned off, when the transmission quality of the system is very low, if the operator has a strict requirement for data transmission and high quality transmission needs to be ensured, the turning-off time may be reduced moderately, and if the operator has a loose requirement for data transmission, the turning-off time may be increased moderately).

Preferably, determining the number of antennas to be turned off and the length of the turning-off time in any data transmission period according to the transmission quality of the system and based on a direct proportion relationship includes: acquiring the transmission quality of the system regularly; determining, according to the transmission quality of the system that is acquired in a timing period and based on the direct proportion relationship, the number of antennas to be turned off and the turning-off time that are in a current data transmission period.

In the foregoing exemplary scheme, in order to ensure that the number of antennas to be turned off and the length of the turning-off time are determined according to the real-time transmission quality of the system, a timing period for acquiring the transmission quality of the system is set, and the transmission quality of the system is acquired regularly in each timing period. There is no strict magnitude relationship between the timing period and the data transmission period. The timing period may be longer than the data transmission period or may be shorter than the data transmission period. Preferably, the timing period is equal to the data transmission period. For the current data transmission period, an exemplary method is: determining the number of antennas to be turned off and the turning-off time that are in the current data transmission period according to the transmission quality of the system that is acquired in the latest timing period.

Step 202: During the turning-off time, turn off the determined number of antennas, turn on remaining antennas other than the antennas that are turned-off, and transmit, through the remaining antennas, the data to be transmitted.

Generally, a timing unit is taken as the minimum time unit of the data transmission period, where the timing unit includes a symbol, a timeslot, a subframe, or a frame. A timeslot consists of symbols, a subframe consists of timeslots, and a frame consists of subframes. Assuming that, for example, a subframe is the timing unit, if the whole data transmission period is 10 subframes, and it is determined that the turning-off time of the antennas accounts for 20% of the whole data transmission period, that is, the turning-off time is 2 subframes, and besides that any two consecutive subframes may be selected from the 10-subframe data transmission period as the turning-off time, in order to further improve the transmission performance of the system, preferably, turning off the determined number of antennas during the turning-off time includes: evenly selecting, from the data transmission period, the timing units in which the antennas are to be turned off, so that the timing units are evenly distributed in the data transmission period, where the sum of time of the timing units in which the antennas are to be turned off is the determined turning-off time, a timing unit is taken as the minimum time unit of the data transmission period, and the timing unit includes a symbol, a timeslot, a subframe, or a frame; and selecting the antennas to be turned off from all transmit antennas for each timing unit in which the antennas are to be turned off, where the sum of all the numbers of antennas to be turned off are the determined number of antennas to be turned off.

In the foregoing exemplary scheme, according to the principle of distributing the timing units evenly, for example, for the circumstance where the transmission period is 10 subframes and the turning-off time is 2 subframes, the first subframe of the first 5 subframes of the data transmission period may be selected as one subframe of the turning-off time, and the first subframe of the subsequent 5 subframes of the data transmission period may be selected as another subframe of the turning-off time, so that the 2 subframes of the turning-off time are evenly distributed in the whole data transmission period. Of course, in addition to the foregoing way of selection, other ways of selection may also be used to ensure that all subframes of the turning-off time are distributed evenly in the whole data transmission period. In addition, besides that the timing unit may be a subframe, the timing unit may also be a symbol, a timeslot, or a frame. It is readily conceivable that because a timeslot consists of symbols and a subframe consists of timeslots, when the timing unit is a timeslot, if the timeslots are distributed evenly in the whole data transmission period, the subframes are also necessarily distributed evenly in the whole data transmission period; when the timing unit is a symbol, if the symbols are distributed evenly in the whole data transmission period, the timeslots are also necessarily distributed evenly in the whole data transmission period, and finally, it may also be ensured that the subframes are distributed evenly in the whole data transmission period. After the timing units in which the antennas are to be turned off are determined, the antennas to be turned off are selected from all transmit antennas for each timing unit in which the antennas are to be turned off. For example, assuming that in a two-antenna system, one antenna is to be turned off in the current data transmission period during the turning-off time having a length of two subframes, the antenna 1 is selected to be turned off in the 2 subframes of the turning-off time.

In order to improve the transmission performance of the system, the antennas to be turned off may also be selected on a basis of equal probability. Therefore, further preferably, turning off the determined number of antennas during the turning-off time includes: evenly selecting, from the data transmission period, the timing units in which the antennas are to be turned off, so that the timing units are evenly distributed in the data transmission period, where the sum of time of all the timing units in which the antennas are to be turned off is the determined turning-off time, a timing unit is taken as the minimum time unit of the data transmission period, and the timing unit includes a symbol, a timeslot, a subframe, or a frame; and selecting, on a basis of equal probability and according to the principle of equal probability of selection, the antennas to be turned off from all transmit antennas for each timing unit in which the antennas are to be turned off, where the sum of all the numbers of antennas to be turned off is the determined number of antennas to be turned off.

In this further exemplary scheme, beside that the antennas to be turned off may be arbitrarily selected from all transmit antennas for each timing unit in which the antennas are to be turned off, the antennas to be turned off may also be selected, on a basis of equal probability and according to the principle of equal probability of selection, from all transmit antennas for each timing unit in which the antennas are to be turned off, so that the probability that each antenna is selected is equal. For example, assuming that in a two-antenna system, one antenna is to be turned off in the current data transmission period during the turning-off time having a length of two subframes, the antenna 0 is selected to be turned off in the first subframe of the turning-off time, and the antenna 1 is selected to be turned off in the second subframe of the turning-off time. Of course, in addition to the foregoing way of selection of "turning off by rotation", for other numbers of antennas to be turned off and other lengths of turning-off time, other ways of selection may also be used to ensure that each antenna is selected to be turned off on a basis of equal probability.

In addition, besides that the antennas to be turned off may be selected, according to the principle of equal probability of selection and on a basis of equal probability, from all transmit antennas for each timing unit in which the antennas are to be turned off, the antennas to be turned off may also be selected, according to a predetermined selection proportion, for each timing unit in which the antennas are to be turned off. For example, assuming that in a two-antenna system, the turning-off time accounts for 30% of the whole data transmission period, that is, the turning-off time is 3 subframes, the number of antennas to be turned off is 1, and the antennas are selected for each timing unit on a basis of equal probability, the antenna 0 may be selected to be turned off in the turning-off time of the $1^{st}$ and the $7^{th}$ subframes, and the antenna 1 may be selected to be turned off in the turning-off time of the $4^{th}$ subframe.

In addition to the foregoing implementation method where the determined number of antennas are turned off during the determined length of time in the data transmission period, another exemplary implementation method is that the data to be transmitted is distinguished into coverage frames and energy-saving frames, and in the coverage frames, the system is in a normal operating state, and in the energy-saving frames, the system is in an energy-saving state, so that by adjusting the proportion of the number of coverage frames to the number of energy-saving frames, the objective of saving energy and reducing power consumption may be achieved. On this basis, turning off the determined number of antennas during the determined length of time in the data transmission period includes: determining the number of coverage frames and the number of energy-saving frames according to the amount of service traffic, where the system is in a normal operating state in the coverage frames and in an energy-saving state in the energy-saving frames; turning on all the antennas in the coverage frames, turning on all the antennas in important subframes that are for transmitting important signaling in the energy-saving frames, and selecting the antennas to be turned off in the remaining subframes in the energy-saving frames other than the important subframes.

In the current technologies, in an LTE system, the $0^{th}$ subframe for transmitting broadcast information and synchronization information, the $5^{th}$ subframe for transmitting synchronization information, and the $4^{th}$ subframe and the $9^{th}$ subframe that are for transmitting paging information are all subframes for transmitting important signaling. Of course, in addition to treating these subframes as important subframes that are for transmitting important signaling, important subframes that are for transmitting important signaling may also be set according to a specific system design. The embodiments of the present invention do not limit which subframes are important subframes in a data frame.

An exemplary implementation method is that all the antennas are turned on in the $0^{th}$ and $5^{th}$ subframes of the energy-saving frames, and the antennas to be turned off are selected in the $1^{st}$, $2^{nd}$, $3^{rd}$, $6^{th}$, $7^{th}$ and $8^{th}$ subframes; when signaling is being transmitted, all the antennas are turned on in the $4^{th}$ and $9^{th}$ subframes; and when service data is being transmitted, the antennas to be turned off are selected in the $4^{th}$ and $9^{th}$ subframes, where the sum of all the numbers of antennas to be turned off is the determined number of antennas to be turned off. Further preferably, the determined number of coverage frames and the determined number of energy-saving frames may be set in the data to be transmitted, according to the principle that the coverage frames and the energy-saving frames are distributed evenly in the data to be transmitted.

Figure 3:
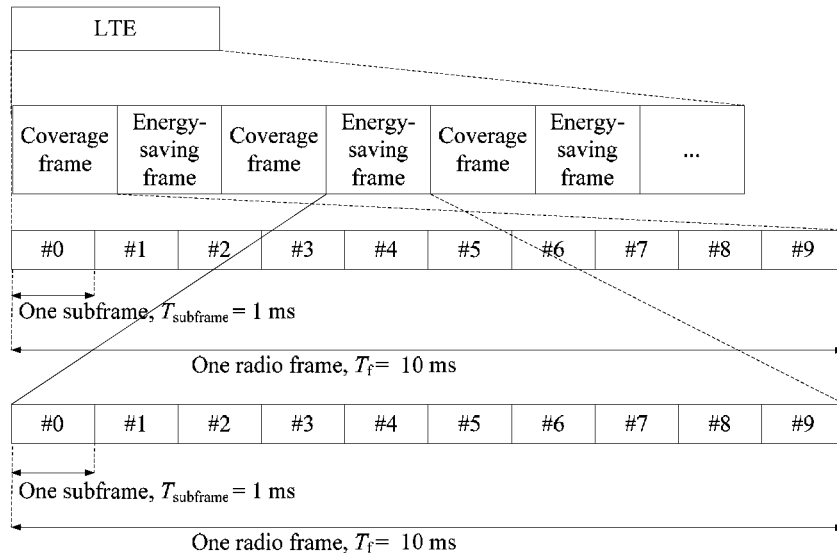
FIG. 3 is a schematic structural diagram of data to be transmitted according to the present invention.

For example, as shown in FIG. 3, the proportion of the number of coverage frames to the number of energy-saving frames is determined to be 1:1 according to the amount of the service traffic, and the determined number of coverage frames and the determined number of energy-saving frames may be set in the data to be transmitted on an alternate basis like this: one coverage frame, one energy-saving frame, one coverage frame, one energy-saving frame, and so on. Therefore, the coverage frames and the energy-saving frames can be evenly distributed in the data to be transmitted, each coverage frame and each energy-saving frame include 10 subframes, the period of each subframe is 1 ms, and the period of a coverage frame as a whole radio frame and the period of an energy frame as a whole radio frame are both 10 ms. All the antennas are turned on in the coverage frames, all the antennas are turned on in the $0^{th}$ subframes and the $5^{th}$ subframes of the energy-saving frames, and the antennas to be turned off are selected in the $1^{st}$, $2^{nd}$, $3^{rd}$, $6^{th}$, $7^{th}$, and $8^{th}$ subframes; when signaling is being transmitted, all the antennas are turned on in the $4^{th}$ and $9^{th}$ subframes, and when service data is being transmitted, the antennas to be turned off are selected in the $4^{th}$ and $9^{th}$ subframes.

In addition, when turning off the determined number of antennas during the determined length of turning-off time in the data transmission period, a way of turning off the antennas is: turning off the all radio frequency channels on the determined number of antennas during the turning-off time; and another way of turning off the antennas is: turning off at least one radio frequency unit in the radio frequency channels on the determined number of antennas during the turning-off time.

When turning on the remaining antennas other than the antennas to be turned off, a way of turning on the antennas is: turning on the remaining antennas other than the antennas to be turned off, where the transmit power of the remaining antennas remains unchanged; and another way of turning on the antennas is: increasing the transmit power of the remaining antennas other than the antennas to be turned off, where increased transmit power is not bigger than the maximum transmit power of the power amplifier, and turning on the remaining antennas with the increased transmit power.

Figure 4:
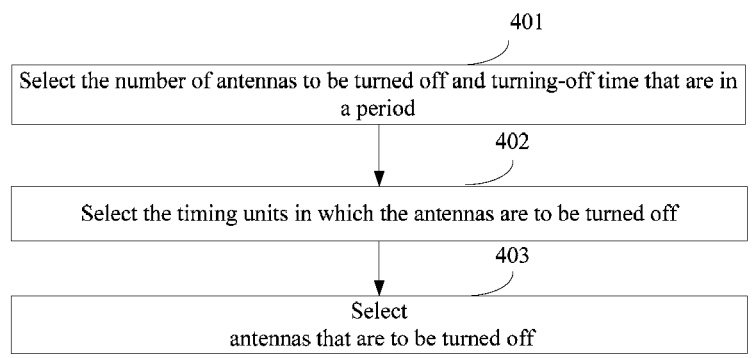
FIG. 4 is a design flowchart of a method of transmitting data according to the present invention.

FIG. 4 is a design flowchart of a method of transmitting data according to the present invention, including the following steps:

Step 401: Select the number of antennas to be turned off and turning-off time that are in a period.

Specifically, the transmission quality of the system needs to be acquired regularly, and according to the transmission quality of the system that is acquired in the latest timing period, the number of antennas to be turned off and the turning-off time that are in the current data transmission period are determined according to the direct proportion relationship.

Step 402: Select the timing units in which the antennas are to be turned off.

A timing unit is taken as the minimum time unit of the data transmission period, and the timing unit includes a symbol, a timeslot, a subframe, or a frame. The timing units in which the antennas are to be turned off may be selected evenly from the data transmission period according to the principle that the timing units are distributed evenly in the data transmission period. Alternatively, the number of coverage frames and the number of energy-saving frames may also be determined according to the amount of the service traffic. Here, the system is in a normal operating state in the coverage frames and is in an energy-saving state in the energy-saving frames. The determined number of coverage frames and the determined number of energy-saving frames are selected from the data to be transmitted. All the antennas are turned on in the coverage frames, all the antennas are turned on in the $0^{th}$ and $5^{th}$ subframes of the energy-saving frames, and the antennas to be turned off are selected in the $1^{st}$, $2^{nd}$, $3^{rd}$, $6^{th}$, $7^{th}$, and $8^{th}$ subframes. When signaling is being transmitted, all the antennas are turned on in the $4^{th}$ and $9^{th}$ subframes, and when service data is being transmitted, the antennas to be turned off are selected in the $4^{th}$ and $9^{th}$ subframes, where the sum of all the numbers of antennas to be turned off is the determined number of antennas to be turned off. Preferably, the determined number of coverage frames and the determined number of energy-saving frames are set in the data to be transmitted, according to the principle that the coverage frames and the energy-saving frames are distributed evenly in the data to be transmitted.

Step 403: Select antennas that are to be turned off.

Preferably, the antennas to be turned off are selected, on a basis of equal probability and according to the principle of equal probability of selection, from all transmit antennas for each timing unit in which the antennas are to be turned off, where the sum of all the numbers of antennas to be turned off is the determined number of antennas to be turned off.

Transmitting the data to be transmitted, which is on the remaining antennas other than the antennas to be turned off includes: interceptive transmitting, direct transmitting, linear combination mapping, or overlapped combination transmitting.

The interceptive transmitting is allocating the data to be transmitted, which is on the antennas to be turned off, to at least one of the remaining antennas, and discarding the data to be transmitted, which is on the at least one of the remaining antennas. For example, for a two-antenna system, if the antenna 1 is selected to be turned off, the data to be transmitted (including pilot signals and data signals) on the antenna 1 is allocated to the antenna 0, and finally, allocated data is transmitted by the antenna 0.

The direct transmitting is discarding the data to be transmitted, which is on the antennas to be turned off, where the data to be transmitted, which is on the remaining antennas other than the antennas to be turned off remains unchanged.

The linear combination transmitting is linearly combining the data to be transmitted which is on the antennas to be turned off and the data to be transmitted which is on the remaining antennas other than the antennas to be turned off, and allocating linearly combined data to the remaining antennas. For example, for a two-antenna system, if the antenna 1 is selected to be turned off, the data to be transmitted which is on the antenna 1 and the data to be transmitted which is on the antenna 0 are combined linearly, the combined data is allocated to the antenna 0, and finally, the combined data is transmitted by the antenna 0. In particular, because the locations of the pilot signals may be orthogonal on different antennas, if the locations are orthogonal, the remaining antennas simultaneously transmit, at the locations of the pilot signals, all pilot signals on the antennas to be turned off and the remaining antennas.

The overlapped combination transmitting is combining, by overlapping, the data to be transmitted which is on the antennas to be turned off and the data to be transmitted which is on the remaining antennas other than the antennas to be turned off, and allocating data, which is combined by overlapping, to the remaining antennas. For example, in a two-antenna system, if both the antenna 0 and the antenna 1 use QPSK (Quadrature Phase Shift Keying, quadrature phase shift keying) for transmitting data, when the antenna 0 is selected to be turned off, after signal overlapping is performed with respect to the data to be transmitted, which is on the antenna 0 and the antenna 1, the antenna 0 may use 16QAM for transmitting combined signals.

Step 203: During the remaining time of the data transmission period excluding the turning-off time, turn on all the antennas and transmit, through all the antennas, the data to be transmitted.

For example, the data transmission period is 10 subframes. When it is determined that the turning-off time accounts for 20% of the whole data transmission period, that is, 2 subframes, all the antennas are turned on in the remaining 8 subframes other than the 2 subframes, and the data to be transmitted is transmitted on all the antennas.

Figure 5:
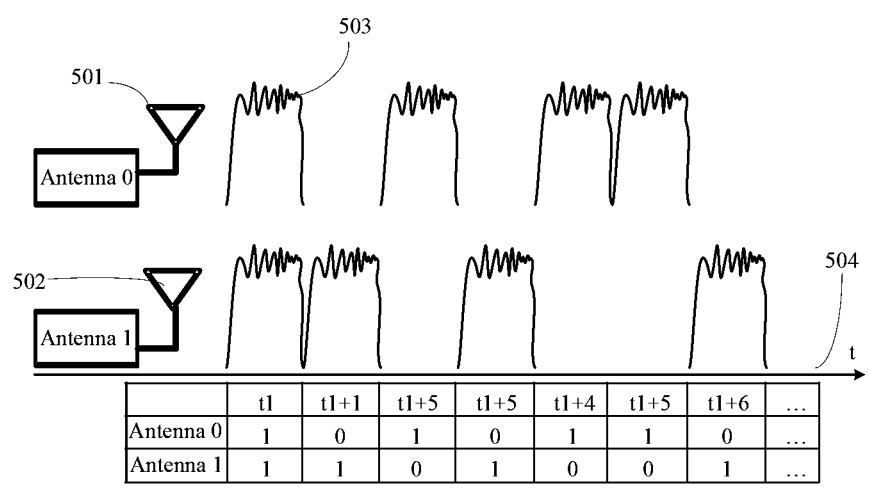
FIG. 5 is a schematic diagram of a transmit pattern of a two-antenna system according to the present invention.
Figure 6:
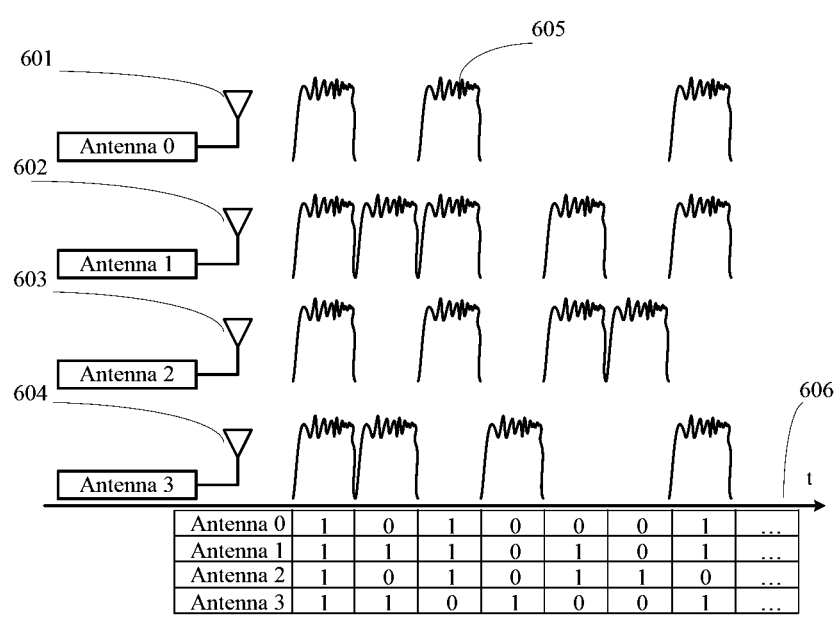
FIG. 6 is a schematic diagram of a transmit pattern of a four-antenna system according to the present invention.

In steps 201 to 203, the method for transmitting data in each data transmission period is determined, and according to this method for transmitting data, a transmit pattern on a time axis may be determined. As shown in FIG. 5 and FIG. 6, FIG. 5 is a schematic diagram of a transmit pattern of a two-antenna system according to the present invention, and FIG. 6 is a schematic diagram of a transmit pattern of a four-antenna system according to the present invention. In FIG. 5, 501 is the antenna 0, 502 is the antenna 1, 503 is the signals transmitted by the antennas, 504 is a time axis, and t1, t1+1, t1+2, t1+3, t1+4, t1+5, and t1+6 represent 7 consecutive timing units. "0" in the table means that the antenna is in an off state, and "1" means that the antenna is in an on state. In FIG. 6, 601 is the antenna 0, 602 is the antenna 1, 603 is the antenna 2, 604 is the antenna 3, 605 is the signals transmitted by the antennas, 606 is a time axis, and t1, t1+1, t1+2, t1+3, t1+4, t1+5, and t1+6 represent 7 consecutive timing units. "0" in the table means that the antenna is in an off state, and "1" means that the antenna is in an on state.

For a non-transmit diversity mode, such as a multiplexing mode, it may be switched to a transmit diversity mode first, and after that, the technical solutions of the present invention are implemented in the transmit diversity mode. Here, it should be noted that in the technical solutions of the present invention, the way of switching the non-transmit diversity mode to a transmit diversity mode is not limited, and that any way of switching provided in the prior art may be used.

The transmit diversity mode includes a transmit diversity mode with space time coding and a transmit diversity mode with space frequency coding. When the transmit diversity mode is used to transmit data, no change needs to be made to the terminal, which is demonstrated as follows with respect to the space frequency coding of a two-antenna system:

When a transmitting end uses the space frequency coding of a non-transmit diversity mode, the transmitting method and receiving method are:

For any given data transmission period t, on two different carriers, the transmit signals of two antennas may be represented as (assuming that different columns of a matrix represent the transmit signals of different transmit antennas):

$$\begin{pmatrix} s_0 & s_1 \\ -s_1^* & s_0^* \end{pmatrix}$$

Assuming that a receiving end receives the signals through a single receive antenna (which is the most common way of configuration of a receive antenna currently), a channel gain may be represented as a 2*1 vector $h=[h_0 \ h_1]^T$, where $h_0=\alpha_0 e^{j\theta_0}, h_1=\alpha_1 e^{j\theta_1}$, and $\alpha_i$ and $\theta_i$ are respectively signal attenuation amplitudes and phases on two spatial paths. At the time of reception, a receiver using Alamouti codes demodulates signals, and the demodulated signals are:

$$\tilde{s}_0 = (\alpha_0^2 + \alpha_1^2)s_0 + h_0^* n_0 + h_1 n_1^*$$

$$\tilde{s}_1 = (\alpha_0^2 + \alpha_1^2)s_1 - h_0^* n_1 + h_1 n_0^* \quad (1)$$

Therefore, the two signals may be decoded separately.

When the space frequency coding scheme of the transmit diversity mode of the present invention is used, the transmitting method and receiving method with one of the antennas turned off are:

one antenna is turned off (assuming that the antenna 1 is turned off), but another antenna maintains normal transmitting (assuming that the antenna 0 maintains normal transmitting), so that in the transmission period t, the transmit signals of the two antennas on different carriers may be represented as:

$$\begin{pmatrix} s_0 & 0 \\ -s_1^* & 0 \end{pmatrix}$$

After the same channel $h=[h_0 \ h_1]^T$ is gone through, the same receiver structure is used, and the signals at the receiving end are:

$$r_0 = r(t) = h_0 s_0 + n_0$$
$$r_1 = r(t+T) = -h_0 s_1^* + n_1,$$

and through transformation, $$r_0^* = r^*(t) = h_0^* s_0^* + n_0^*$$
$$r_1^* = r^*(t+T) = -h_0^* s_1 + n_1^*$$

may be obtained.

A receiver using Alamouti codes demodulates the signals, and the demodulated signals are:

$$\tilde{s}_0 = h_0^* r_0 + h_1 r_1^*$$
$$= h_0^*(h_0 s_0 + n_0) + h_1(-h_0^* s_1 + n_1^*)$$
$$= \alpha_0^2 s_0 - h_0^* h_1 s_1 + h_0^* n_0 + h_1 n_1^*$$

-continued $$\tilde{s}_1 = h_1^* r_0 - h_0 r_1^*$$
$$= h_1^* (h_0 s_0 + n_0) - h_0 (-h_0^* s_1 + n_1^*)$$
$$= \alpha_0^2 s_1 + h_0 h_1^* s_0 + h_1^* n_0 - h_0 n_1^*$$

Because in the process of turning off the antenna 1, the pilot signals are simultaneously turned off, after channel estimation is completed at the receiver side, the estimated value of the channel gain of the antenna 0 is close to 0, that is, $h_1 \approx 0$. Therefore, the original $\tilde{s}_0$ and $\tilde{s}_1$ signals may be simplified to $\tilde{s}_0 = \alpha_0^2 s_0 + h_0^* n_0$ and $\tilde{s}_1 = \alpha_0^2 s_1 - h_0^* n_1$. Therefore, the decoding method of using the Alamouti codes can restore the original signals $s_0$ and $S_1$ (the principle is the same as that of (1)).

It may be found from the foregoing demonstration that: in the mentioned transmit diversity mode, for discontinuous transmission of multiple antennas, no adjustment needs to be made to the terminal side, and except that the data and pilots, which are corresponding to the antennas to be turned off, are not transmitted, other operations of the transmitting end remain unchanged.

By using the same method, it may also be demonstrated that in the transmit diversity mode with space time coding, no change needs to be made to the terminal. The specific demonstration principle is the same as above, and is not repeatedly described here.

The beneficial effect is further demonstrated in the following: with two antennas as an example, the power of the base station is P=40 W, and noise power is No=0.1 W; assuming that in 10% of the data transmission period, the antenna 0 is turned on and the antenna 1 is turned off (the "turning off" here means turning off a whole radio frequency channel, which saves 50% of total radio frequency energy consumption); in 10% of the data transmission period, the antenna 1 is turned on and the antenna 0 is turned off; and in 80% of the time, the system is in an operating state where two antennas are both turned on.

When the gains of the antennas are |h0|=0.9 and |h1|=0.85, in the state of discontinuous transmission, if the power of the remaining antennas remains unchanged, the average total radio frequency energy is saved by 10%, and capacity is decreased by 2.41%; if the power of the remaining antennas is doubled, the average total radio frequency energy is saved by 6%, and the capacity is decreased by 0.0056%.

When the gains of the antennas are |h0|=0.9 and |h1|=0.10, in the state of discontinuous transmission, if the power of the remaining antennas remains unchanged, the average total radio frequency energy is saved by 10%, and the capacity is decreased by 3.94%; if the power of the remaining antennas is doubled, the average total radio frequency energy is saved by 6%, and the capacity is decreased by 2.76%.

As may be seen from the foregoing embodiments, in the technical solutions disclosed by the present invention, the antennas are turned off dynamically according to the transmission quality of the system, which not only reduces dynamic and static energy consumption of radio frequency channels corresponding to the antennas that are turned off, thus reducing the total transmit power consumption of the system, but also considers the dynamic transmission performance of the system.

In addition, while dynamically changing the number of transmit antennas to achieve the objective of energy saving, the technical solutions disclosed by the present invention reduce notification signaling overhead and improve flexibility of applications, as compared with conventional mechanisms for changing the number of antennas, which are mainly reflected in the following aspects:

(1) Because the technical solutions are applied in a diversity mode, when the data to be transmitted is transmitted only through the antennas that are turned on, the receiving end receives the data in a normal way of reception as before the antennas are turned off. Therefore, the receiver structure on the receiving end does not need to be changed with the dynamic change of the number of transmit antennas, and the reception is still performed in the way under the original number of antennas, thus maintaining the continuity of the way of transmission and reception and reducing protocol process overhead.

(2) Further, because the receiving end receives the data in the normal way of reception as before the antennas are turned off, the transmitting end does not need to notify the change of the number of transmit antennas. Therefore, the transmitting end does not need to transfer additional signaling to the receiving end because of the change of the number of transmit antennas, thus reducing signaling overhead.

(3) Because the number of antennas that are turned off and the length of the turning-off time may be changed in each data transmission period, rather than fixed numerical values, the way of transmission of the antennas may be changed flexibly, thus accommodating to the change of the amount of service traffic or channel fluctuation in a short time.

Embodiment 2

Figure 8:
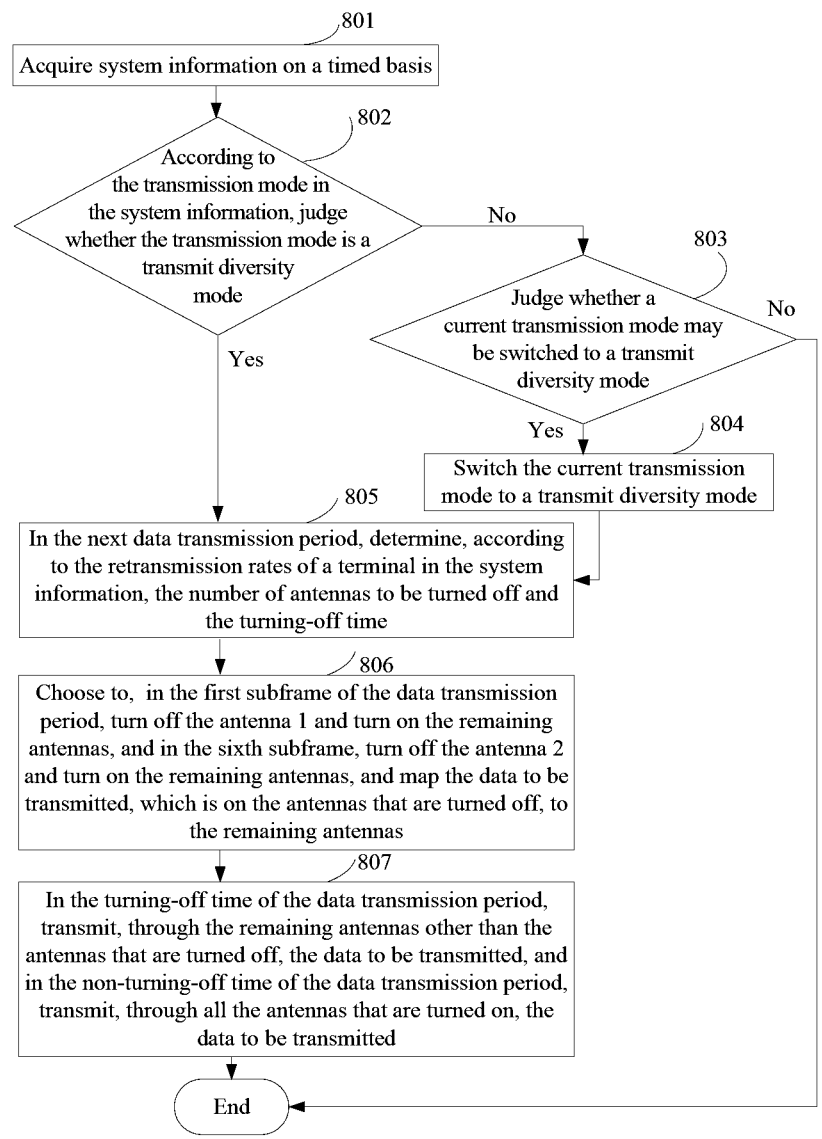
FIG. 8 is a flowchart of an embodiment of a method for transmitting data in a four-antenna system according to the present invention.

How to transmit data in a four-antenna system is described in detail in the following by taking a device or an apparatus of a four-antenna system as an example. It may be directly known that in a four-antenna system, there are 16 ways of transmitting data, as shown in FIGS. 7A, 7B and 7C, which is a schematic diagram of a mode of transmitting data in a four-antenna system according to the present invention. In addition, the following setting is applied: the timing period for acquiring the transmission quality of the system is the same as and synchronized with the period of transmitting data, and the data transmission period of multiple antennas is 10 subframes. FIG. 8 is a flowchart of an embodiment of a method for transmitting data in a four-antenna system according to the present invention. The method includes the following steps:

Step 801: Acquire system information regularly.

The system information includes a transmission mode, the number of terminals, and a retransmission rate of each terminal in a current timing period.

Step 802: According to the transmission mode in the system information, judge whether the transmission mode is a transmit diversity mode; if yes, proceed to step 805, otherwise, proceed to step 803.

Step 803: Judge whether a current transmission mode may be switched to a transmit diversity mode; if yes, proceed to step 804, and otherwise, end the process.

Step 804: Switch the current transmission mode to a transmit diversity mode.

Step 805: In the next data transmission period, determine, according to the retransmission rates of a terminal in the system information, the number of antennas to be turned off and the turning-off time.

In this embodiment, because the timing period for acquiring the transmission quality of the system is set to be the same as and synchronized with the data transmission period, it is readily conceivable that the retransmission rates acquired in the current timing period are used for determining the number of antennas to be turned off and the length of the turning-off time that are in the next data transmission period.

Assume that in the embodiment of the present invention, it is determined according to the retransmission rates that the number of antennas to be turned off is 2, and that the length of the turning-off time accounts for 20% of the whole data transmission period.

Step 806: Choose to, in the first subframe of the data transmission period, turn off the antenna 1 and turn on the remaining antennas, and in the sixth subframe, turn off the antenna 2 and turn on the remaining antennas, and map the data to be transmitted, which is on the antennas that are turned off, to the remaining antennas.

That is, in the first subframe, the antenna 1 is turned off and the antennas 0, 2, and 3 are turned on, and the data to be transmitted, which is on the antenna 1 that is turned off, is mapped to any one of the antennas 0, 2, and 3; and the antenna 2 is turned off in the sixth subframe, and the antennas 0, 1, and 3 are turned on, and the data to be transmitted, which is on the antenna 2 that is turned off, is mapped to any one of the antennas 0, 1, and 3.

The turning-off mode is as shown in the FIGS. 7A, 7B and 7C. As may be seen from the FIGS. 7A, 7B and 7C, the turning-off time is distributed evenly in the whole data transmission period, and the antenna to be turned off is selected from the 4 transmit antennas on a basis of equal probability.

Step 807: In the turning-off time of the data transmission period, transmit, through the remaining antennas other than the antennas that are turned off, the data to be transmitted, and in the non-turning-off time of the data transmission period, transmit, through all the antennas that are turned on, the data to be transmitted.

In the first subframe, the antennas 0, 2, and 3 transmit the data to be transmitted, where the data to be transmitted includes the data to be transmitted that is allocated to the antennas 0, 2, and 3 and the data to be transmitted that is allocated to the antenna 1; and in the sixth subframe, the antennas 0, 1, and 3 transmit the data to be transmitted, where the data to be transmitted includes the data to be transmitted that is allocated to the antennas 0, 1, and 3 and the data to be transmitted that is mapped from the antenna 2.

As may be seen from the foregoing embodiments, in the technical solutions disclosed by the present invention, the antennas are turned off dynamically according to the transmission quality of the system, which not only reduces dynamic and static energy consumption of radio frequency channels corresponding to the antennas that are turned off, thus reducing the total transmit power consumption of the system, but also considers the dynamic transmission performance of the system.

In addition, while dynamically changing the number of transmit antennas to achieve the objective of energy saving, the technical solutions disclosed by the present invention reduce the notification signaling overhead and improve flexibility of applications as compared with conventional mechanisms of changing the number of antennas, which are mainly reflected in the following aspects:

(1) Because the technical solutions are applied in a diversity mode, when the data to be transmitted is transmitted only through the antennas that are turned on, the receiving end receives the data in a normal way of reception as before the antennas are turned off. Therefore, the receiver structure on the receiving end does not need to be changed with the dynamic change of the number of transmit antennas, and the reception is still performed in the way under the original number of antennas, thus maintaining the continuity of the way of transmission and reception and reducing the protocol process overhead.

(2) Further, because the receiving end receives the data in the normal way of reception as before the antennas are turned off, the transmitting end does not need to notify the change of the number of transmit antennas. Therefore, the transmitting end does not need to transfer additional signaling to the receiving end because of the change of the number of transmit antennas, thus reducing the signaling overhead.

(3) Because the number of antennas that are turned off and the length of the turning-off time may be changed in each data transmission period, rather than fixed numerical values, the way of transmission of the antennas may be changed flexibly, thus accommodating to the change of the amount of service traffic or channel fluctuation in a short time.

Embodiment 3

Figure 9:
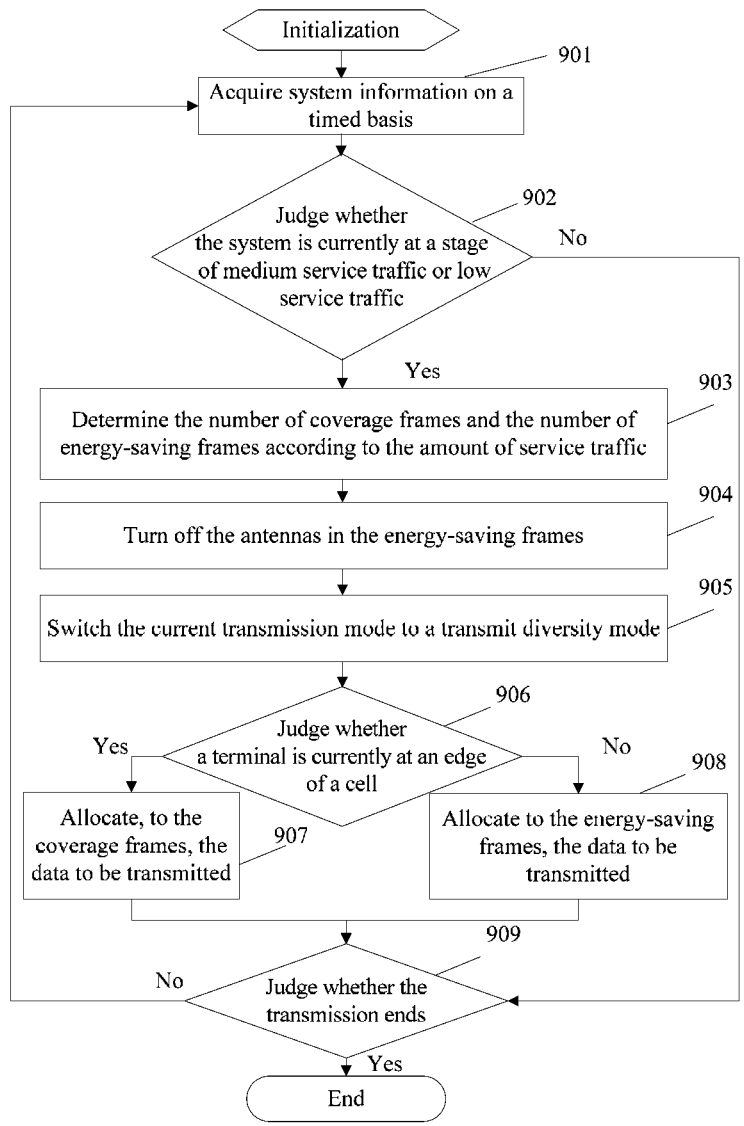
FIG. 9 is a flowchart of another embodiment of a method for transmitting data in a four-antenna system according to the present invention.

Another method for transmitting data is described in the following by taking as an example of the setting of a proportion of coverage frames to energy-saving frames in a four-antenna systems. FIG. 9 is a flowchart of another embodiment of a method for transmitting data in a four-antenna system according to the present invention. The method includes the following steps:

Step 901: Acquire system information regularly.

Step 902: Judge whether the system is currently at a stage of medium service traffic or low service traffic; if yes, proceed to step 903, otherwise, proceed to step 909.

Step 903: Determine the number of coverage frames and the number of energy-saving frames according to the amount of service traffic.

The system is in a normal operating state in the coverage frames, and is in an energy-saving state in the energy-saving frames.

Step 904: Turn off the antennas in the energy-saving frames.

The way of turning off the antennas may be turning off all radio frequency channels on the antennas or turning off at least one radio frequency unit in the radio frequency channels on the antennas. The number of antennas to be turned off and the length of the turning-off time in the energy-saving frames are determined according to the transmission quality of the system and based on a direct proportion relationship. The relevant determination process has been described in the first embodiment and is not repeatedly described here.

Step 905: Switch the current transmission mode to a transmit diversity mode.

If the current transmission mode is a transmit diversity mode, no switching is needed, and if the current transmission mode is not a transmit diversity mode, the current transmission mode needs to be switched to a transmit diversity mode.

Step 906: Judge whether a terminal is currently at an edge of a cell; if yes, proceed to step 907, otherwise, proceed to step 908.

Step 907: Allocate, to the coverage frames, the data to be transmitted.

Step 908: Allocate, to the energy-saving frames, the data to be transmitted.

Step 909: Judge whether the transmission ends; if yes, end the process, otherwise, return to step 901.

As may be seen from the foregoing embodiments, in the technical solutions disclosed by the present invention, the antennas are turned off dynamically according to the transmission quality of the system, which not only reduces dynamic and static energy consumption of radio frequency channels corresponding to the antennas that are turned off, thus reducing the total transmit power consumption of the system, but also considers the dynamic transmission performance of the system.

In addition, while dynamically changing the number of transmit antennas to achieve the objective of energy saving, the technical solutions disclosed by the present invention reduce the notification signaling overhead and improve flexibility of applications as compared with conventional mechanisms of changing the number of antennas, which are mainly reflected in the following aspects:

(1) Because the technical solutions are applied in a diversity mode, when the data to be transmitted is transmitted only through the antennas that are turned on, the receiving end receives the data in a normal way of reception as before the antennas are turned off. Therefore, the receiver structure on the receiving end does not need to be changed with the dynamic change of the number of transmit antennas, and the reception is still performed in the way under the original number of antennas, thus maintaining the continuity of the way of transmission and reception and reducing the protocol process overhead.

(2) Further, because the receiving end receives the data in the normal way of reception as before the antennas are turned off, the transmitting end does not need to notify the change of the number of transmit antennas. Therefore, the transmitting end does not need to transfer additional signaling to the receiving end because of the change of the number of transmit antennas, thus reducing the signaling overhead.

(3) Because the number of antennas that are turned off and the length of the turning-off time may be changed in each data transmission period, rather than fixed numerical values, the way of transmission of the antennas may be changed flexibly, thus accommodating to the change of the amount of service traffic or channel fluctuation in a short time.

Embodiment 4

Figure 10:
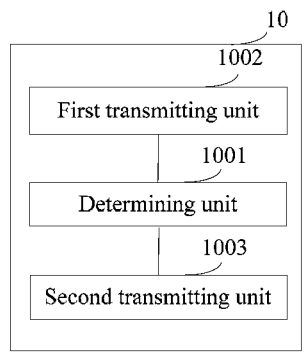
FIG. 10 is a structural diagram of an embodiment of an apparatus for transmitting data in a multiple-antenna system according to the present invention.

In order to implement the foregoing method for transmitting data in a multiple-antenna system, an embodiment of the present invention also provides an apparatus for transmitting data in a multiple-antenna system, such as a base station in radio communication, which can be used in radio communication systems supporting multiple-antenna diversity, such as LTE, HSPA, and WiMAX. The apparatus is used for completing the steps and processes in the foregoing method embodiments, and the operations and processing that may be performed in the method can be executed by corresponding modules or units in the apparatus embodiment. FIG. 10 is a structural diagram of an embodiment of an apparatus for transmitting data in a multiple-antenna system according to the present invention. The apparatus 10 for transmitting data is applied in a transmit diversity mode, and includes a determining unit 1001, a first transmitting unit 1002, and a second transmitting unit 1003. The internal structure and the connection relationship of the apparatus are further described below in conjunction with the operating principle of the apparatus.

The determining unit 1001 is configured to determine, in a data transmission period and according to transmission quality of the system, the number of antennas to be turned off and turning-off time.

The first transmitting unit 1002 is configured to turn off the determined number of antennas during the turning-off time, turn on remaining antennas other than the antennas that are turned off, and transmit, through the remaining antennas, the data to be transmitted.

The second transmitting unit 1003 is configured to turn on all the antennas during the remaining time of the data transmission period excluding the turning-off time and transmit, through all the antennas, the data to be transmitted.

Preferably, the transmit diversity mode includes a transmit diversity mode with space time coding and a transmit diversity mode with space frequency coding.

Figure 11:
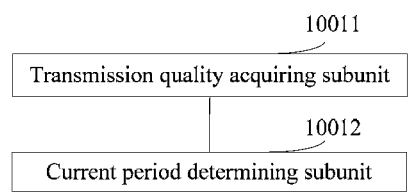
FIG. 11 is a schematic structural diagram of a determining unit according to the present invention.

Preferably, FIG. 11 is a schematic structural diagram of the determining unit according to the present invention. As shown in FIG. 11, the determining unit 1001 includes: a transmission quality acquiring subunit 10011 and a current period determining subunit 10012.

The transmission quality acquiring subunit 10011 is configured to acquire the transmission quality of the system regularly.

The current period determining subunit 10012 is configured to determine the number of antennas to be turned off and the length of the turning-off time, which are in the current data transmission period, according to the transmission quality of the system that is acquired in a timing period and based on a direct proportion relationship.

Figure 12:
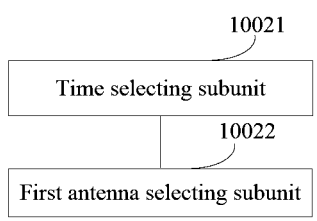
FIG. 12 is a schematic structural diagram of a first transmitting unit according to the present invention.

Preferably, FIG. 12 is a schematic structural diagram of the first transmitting unit according to the present invention. As shown in FIG. 12, the first transmitting unit 1002 includes: a time selecting subunit 10021 and a first antenna selecting subunit 10022.

The time selecting subunit 10021 is configured to evenly select, from the data transmission period, the timing units in which the antennas are to be turned off, so that the timing units are evenly distributed in the data transmission period, where the sum of time of all the timing units in which the antennas are to be turned off is the determined turning-off time, the timing unit is taken as the minimum time unit of the data transmission period, and the timing unit includes a symbol, a timeslot, a subframe, or a frame.

The first antenna selecting subunit 10022 is configured to select the antennas to be turned off from all transmit antennas for each timing unit in which the antennas are to be turned off, where the sum of all the numbers of antennas to be turned off is the determined number of antennas to be turned off.

Figure 13:
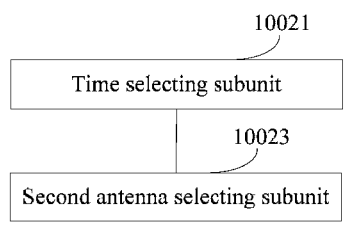
FIG. 13 is another schematic structural diagram of the first transmitting unit according to the present invention.

In addition to the structure in FIG. 12, preferably, another schematic structural diagram of the first transmitting unit according to the present invention is illustrated in FIG. 13. As shown in FIG. 13, the first transmitting unit 1002 includes: a time selecting subunit 10021 and a second antenna selecting subunit 10023.

The time selecting subunit 10021 is configured to evenly select the timing units from the data transmission period, so that the timing units are evenly distributed in the data transmission period, where the sum of time of all the timing units in which the antennas are to be turned off is the determined turning-off time, the timing unit is taken as the minimum time unit of the data transmission period, and the timing unit includes a symbol, a timeslot, a subframe, or a frame.

The second antenna selecting subunit 10023 is configured to select, on a basis of equal probability and according to the principle of equal probability of selection, the antennas to be turned off from all transmit antennas for each timing unit in which the antennas are to be turned off, where the sum of all the numbers of antennas to be turned off is the determined number of antennas to be turned off.

Alternatively, in addition to the exemplary schemes as shown in FIG. 12 and FIG. 13, the first transmitting unit includes: a number determining subunit, a frame selecting subunit and a third antenna selecting subunit.

The number determining subunit is configured to determine the number of coverage frames and the number of energy-saving frames according to the amount of the service traffic, where the system is in a normal operating state in the coverage frames and is in an energy-saving state in the energy-saving frames.

The frame selecting subunit is configured to select the determined number of coverage frames and the determined number of energy-saving frames from the data to be transmitted.

The third antenna selecting subunit is configured to turn on all the antennas in the coverage frames, turn on all the antennas in important subframes that are for transmitting important signaling in the energy-saving frames, and select the antennas to be turned off in the remaining subframes other than the important subframes in the energy-saving frames, where the sum of all the numbers of antennas to be turned off is the determined number of antennas to be turned off.

In addition, preferably, in the process of turning off the antennas, the first transmitting unit 1002 includes: a first turning-off subunit, configured to turn off the all radio frequency channels on the determined number of antennas during the turning-off time; or, a second turning-off subunit, configured to turn off at least one radio frequency element in the radio frequency channels on the determined number of antennas.

Preferably, in the process of turning on the antennas, the first transmitting unit 1002 includes: a first turning-on subunit, configured to turn on the remaining antennas other than the antennas to be turned off, where the transmit power of the remaining antennas remains unchanged; or, a second turning-on subunit, configured to increase the transmit power of the remaining antennas other than the antennas to be turned off, where the increased transmit power is not bigger than the maximum transmit power of the power amplifier, and turn on the remaining antennas by using the increased transmit power.

Preferably, in the process of mapping the data to be transmitted, which is on the antennas to be turned off, to the remaining antennas other than the antennas to be turned off, the first transmitting unit 1002 includes:

an interceptive transmitting subunit, configured to allocate the data to be transmitted, which is on the antennas to be turned off, to at least one of the remaining antennas, and discard the data to be transmitted which is on the at least one of the remaining antennas;

or, a direct transmitting subunit, configured to discard the data to be transmitted which is on the antennas to be turned off, where the data to be transmitted which is on the remaining antennas other than the antennas to be turned off remains unchanged;

or, a linear combination transmitting subunit, configured to linearly combine the data to be transmitted which is on the antennas to be turned off and the data to be transmitted which is on the remaining antennas other than the antennas to be turned off, and allocate the linearly combined data to the remaining antennas;

or, an overlapped combination transmitting subunit, configured to combine, by overlapping, the data to be transmitted which is on the antennas to be turned off and the data to be transmitted which is on the remaining antennas other than the antennas to be turned off, and allocate the data, which is combined by overlapping, to the remaining antennas.

As may be seen from the foregoing embodiments, in the technical solutions disclosed by the present invention, the antennas are turned off dynamically according to the transmission quality of the system, which not only reduces dynamic and static energy consumption of radio frequency channels corresponding to the antennas that are turned off, thus reducing the total transmit power consumption of the system, but also considers the dynamic transmission performance of the system.

In addition, while dynamically changing the number of transmit antennas to achieve the objective of energy saving, the technical solutions disclosed by the present invention reduce the notification signaling overhead and improve flexibility of applications as compared with conventional mechanisms of changing the number of antennas, which are mainly reflected in the following aspects:

(1) Because the technical solutions are applied in a diversity mode, when the data to be transmitted is transmitted only through the antennas that are turned on, the receiving end receives the data in a normal way of reception as before the antennas are turned off. Therefore, the receiver structure on the receiving end does not need to be changed with the dynamic change of the number of transmit antennas, and the reception is still performed in the way under the original number of antennas, thus maintaining the continuity of the way of transmission and reception and reducing the protocol process overhead.

(2) Further, because the receiving end receives the data in the normal way of reception as before the antennas are turned off, the transmitting end does not need to notify the change of the number of transmit antennas. Therefore, the transmitting end does not need to transfer additional signaling to the receiving end because of the change of the number of transmit antennas, thus reducing the signaling overhead.

(3) Because the number of antennas that are turned off and the length of the turning-off time may be changed in each data transmission period, rather than fixed numerical values, the way of transmission of the antennas may be changed flexibly, thus accommodating to the change of the amount of service traffic or channel fluctuation in a short time.

It should be noted that persons skilled in the art may understand that all or part of processes in the methods of the above embodiments may be implemented by relevant hardware instructed by a computer program. The program may be stored in a computer readable storage medium and when executed, may include the processes of the embodiments of the above methods. The storage medium may be a magnetic disk, a CD-ROM, a read only memory (Read-Only Memory, ROM), a random access memory (Random Access Memory, RAM), and so on.

A method and an apparatus for transmitting data in a multiple-antenna system according to the present invention are introduced in detail in the above. Although the principle and implementation of the present invention are described with reference to the specific embodiments, the embodiments are intended to help to understand the method and core idea of the present invention. In addition, with respect to the implementation and applicability of the present invention, modifications and variations may be made by persons skilled in the art according to the idea of the present invention. Therefore, the specification shall not be construed as a limitation on the present invention.

What is claimed is:

1. A method for transmitting data in a multiple-antenna system, wherein the method is applied in a transmit diversity mode and comprises:

determining, according to transmission quality of a system, a number of antennas to be turned off and a turning-off time in a data transmission period; and, during the turning-off time, turning off the determined number of antennas, turning on remaining antennas other than antennas that are turned off, and transmitting, through the remaining antennas, data to be transmitted, wherein turning off the determined number of antennas comprises:
  determining a number of coverage frames and a number of energy-saving frames according to an amount of service traffic, wherein the multiple-antenna system is in a normal operating state in the coverage frames and is in an energy-saving state in the energy-saving frames, and
  turning on all antennas in the coverage frames, turning on antennas in the energy-saving frames in subframes that are for transmitting signaling, and selecting antennas to be turned off in remaining subframes other than the antennas in the subframes that are for transmitting signaling, wherein the number of antennas to be turned off in the remaining subframes in the energy-saving frames is equal to the determined number of antennas to be turned off; and
  during a remaining time of the data transmission period excluding the turning-off time, turning on all antennas and transmitting, through all the antennas, the data to be transmitted.

2. The method according to claim 1, wherein the transmit diversity mode comprises a transmit diversity mode with space time coding or a transmit diversity mode with space frequency coding.

3. The method according to claim 1, wherein, in the data transmission period, the determining, according to transmission quality of the system, the number of antennas to be turned off and turning-off time comprises:
  acquiring the transmission quality of the system regularly; and
  determining, according to the transmission quality of the system that is acquired in a timing period and based on a direct proportion relationship, determining the number of antennas to be turned off and the turning-off time that are in a current data transmission period.

4. The method according to claim 1, wherein the turning off the determined number of antennas during the turning-off time comprises:
  evenly selecting, from the data transmission period, timing units in which the antennas are to be turned off, so that the timing units are evenly distributed in the data transmission period, wherein a sum of time of all the timing units in which the antennas are to be turned off is determined turning-off time, a timing unit is taken as a minimum time unit of the data transmission period, and the timing unit comprises a symbol, a timeslot, a subframe, or a frame; and
  selecting the antennas to be turned off from all transmit antennas for each timing unit in which the antennas are to be turned off, wherein a sum of all numbers of antennas to be turned off is determined number of antennas to be turned off.

5. The method according to claim 1, further comprises:
  setting, in the data to be transmitted, the determined number of coverage frames and the determined number of energy-saving frames, according to a principle that the coverage frames and the energy-saving frames are distributed evenly in the data to be transmitted.

6. The method according to claim 1, wherein the turning off the determined number of antennas during the turning-off time comprises:
  evenly selecting, from the data transmission period, timing units in which the antennas are to be turned off, so that the timing units are evenly distributed in the data transmission period, wherein a sum of time of all the timing units in which the antennas are to be turned off is determined turning-off time, a timing unit is taken as a minimum time unit of the data transmission period, and the timing unit comprises a symbol, a timeslot, a subframe, or a frame; and
  selecting, on a basis of equal probability and according to a principle of equal probability of selection, the antennas to be turned off from all transmit antennas for each timing unit in which the antennas are to be turned off, wherein a sum of all numbers of antennas to be turned off is determined number of antennas to be turned off.

7. The method according to claim 1, wherein the turning off the determined number of antennas during the turning-off time comprises:
  turning off all radio frequency channels on the determined number of antennas during the turning-off time;
  or,
  turning off at least one radio frequency element in the radio frequency channels on the determined number of antennas during the turning-off time.

8. The method according to claim 1, wherein the turning on remaining antennas other than the antennas that are turned off comprises:
  turning on the remaining antennas other than the antennas that are turned off, wherein transmit power of the remaining antennas remains unchanged;
  or,
  increasing the transmit power of the remaining antennas other than the antennas to be turned off, wherein increased transmit power is not bigger than maximum transmit power of a power amplifier, and turning on the remaining antennas with the increased transmit power.

9. The method according to claim 1, wherein the transmitting, through the remaining antennas, the data to be transmitted comprises:
  discarding the data to be transmitted which is on the antennas to be turned off, wherein the data to be transmitted, which is on the remaining antennas other than the antennas to be turned off, remains unchanged;
  or,
  allocating the data to be transmitted, which is on the antennas to be turned off, to at least one of the remaining antennas, and discarding the data to be transmitted, which is on the at least one of the remaining antennas;
  or,
  linearly combining the data to be transmitted which is on the antennas to be turned off and the data to be transmitted which is on the remaining antennas other than the antennas to be turned off, and allocating linearly combined data to the remaining antennas;
  or,
  combining, by overlapping, the data to be transmitted which is on the antennas to be turned off and the data to be transmitted which is on the remaining antennas other than the antennas to be turned off, and allocating data, which is combined by overlapping, to the remaining antennas.

10. An apparatus for transmitting data in a multiple-antenna system, wherein the apparatus is applied in a transmit diversity mode and comprises:
  a determining unit, configured to determine, in a data transmission period and according to transmission quality of a system, the number of antennas to be turned off and turning-off time;

a first transmitting unit, configured to turn off determined number of antennas during the turning-off time, turn on remaining antennas other than antennas that are turned off, and transmit, through the remaining antennas, data to be transmitted, wherein the first transmitting unit comprises:
- a number determining subunit, configured to determine the number of coverage frames and the number of energy-saving frames according to an amount of service traffic, wherein the system is in a normal operating state in the coverage frames and is in an energy-saving state in the energy-saving frames; and
- a third antenna selecting subunit, configured to turn on all the antennas in the coverage frames, turn on the antennas the energy-saving frames in subframes that are for transmitting signaling, and select antennas to be turned off in remaining subframes other than subframes that are for transmitting signaling, wherein the number of antennas to be turned off in the remaining subframes in the energy-saving frames is equal to the determined number of antennas to be turned off; and a second transmitting unit, configured to turn on all antennas during the remaining time of the data transmission period excluding the turning-off time and transmit, through all the antennas, the data to be transmitted.

11. The apparatus according to claim 10, wherein the transmit diversity mode comprises a transmit diversity mode with space time coding or a transmit diversity mode with space frequency coding.

12. The apparatus according to claim 10, wherein the determining unit comprises:
- a transmission quality acquiring subunit, configured to acquire the transmission quality of the system regularly; and
- a current period determining subunit, configured to determine the number of antennas to be turned off and the turning-off time in the current data transmission period according to the transmission quality of the system that is acquired in a timing period and based on a direct proportion relationship.

13. The apparatus according to claim 10, wherein the first transmitting unit comprises:
- a time selecting subunit, configured to evenly select, from the data transmission period, timing units in which the antennas are to be turned off, so that the timing units are evenly distributed in the data transmission period, wherein a sum of time of all the timing units in which the antennas are to be turned off is determined turning-off time, a timing unit is taken as a minimum time unit of the data transmission period, and the timing unit comprises a symbol, a timeslot, a subframe, or a frame; and
- a first antenna selecting subunit, configured to select the antennas to be turned off from all transmit antennas for each timing unit in which the antennas are to be turned off, wherein a sum of all numbers of antennas to be turned off is determined number of antennas to be turned off.

14. The apparatus according to claim 10, wherein the first transmitting unit comprises:
- a time selecting subunit, configured to evenly select timing units from the data transmission period, so that the timing units are evenly distributed in the data transmission period, wherein a sum of time of all the timing units in which the antennas are to be turned off is determined turning-off time, a timing unit is taken as a minimum time unit of the data transmission period, and the timing unit comprises a symbol, a timeslot, a subframe, or a frame; and
- a second antenna selecting subunit, configured to select, on a basis of equal probability and according to a principle of equal probability of selection, the antennas to be turned off from all transmit antennas for each timing unit in which the antennas are to be turned off, wherein a sum of all numbers of antennas to be turned off is determined number of antennas to be turned off.

15. The apparatus according to claim 10, wherein the first transmitting unit comprises:
- a first turning-off subunit, configured to turn off all radio frequency channels on the determined number of antennas during the turning-off time;

or,
- a second turning-off subunit, configured to turn off at least one radio frequency element in the radio frequency channels on the determined number of antennas during the turning-off time.

16. The apparatus according to claim 10, wherein the first transmitting unit comprises:
- a first turning-on subunit, configured to turn on the remaining antennas other than the antennas that are turned off, wherein transmit power of the remaining antennas remains unchanged;

or,
- a second turning-on subunit, configured to increase the transmit power of the remaining antennas other than the antennas to be turned off, wherein increased transmit power is not bigger than maximum transmit power of a power amplifier, and turn on the remaining antennas with the increased transmit power.

17. The apparatus according to claim 10, wherein the first transmitting unit comprises:
- an interceptive transmitting subunit, configured to allocate the data to be transmitted, which is on the antennas to be turned off, to at least one of the remaining antennas, and discard the data to be transmitted, which is on the at least one of the remaining antennas;

or,
- a direct transmitting subunit, configured to discard the data to be transmitted, which is on the antennas to be turned off, wherein the data to be transmitted, which is on the remaining antennas other than the antennas to be turned off, remains unchanged;

or,
- a linear combination transmitting subunit, configured to linearly combine the data to be transmitted which is on the antennas to be turned off and the data to be transmitted which is on the remaining antennas other than the antennas to be turned off, and allocate linearly combined data to the remaining antennas;

or,
- an overlapped combination transmitting subunit, configured to combine, by overlapping, the data to be transmitted which is on the antennas to be turned off and the data to be transmitted which is on the remaining antennas other than the antennas to be turned off, and allocate data, which is combined by overlapping, to the remaining antennas.

* * * * *